United States Patent
Doornbos et al.

(10) Patent No.: US 12,054,203 B2
(45) Date of Patent: Aug. 6, 2024

(54) SHAFT COUPLING ASSEMBLY

(71) Applicant: STEERING SOLUTIONS IP HOLDING CORPORATION, Saginaw, MI (US)

(72) Inventors: Jessica A. Doornbos, Grand Blanc, MI (US); William D. Cymbal, Freeland, MI (US); Jason T. Rutkiewicz, Freeland, MI (US); Joel A. Bickel, Millington, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/969,099

(22) Filed: Oct. 19, 2022

(65) Prior Publication Data
US 2023/0045274 A1 Feb. 9, 2023

Related U.S. Application Data

(62) Division of application No. 16/050,670, filed on Jul. 31, 2018, now Pat. No. 11,498,610.

(51) Int. Cl.
| B62D 5/04 | (2006.01) |
| B62D 3/04 | (2006.01) |
| F16D 3/06 | (2006.01) |
| F16D 3/10 | (2006.01) |
| F16H 1/16 | (2006.01) |

(52) U.S. Cl.
CPC ............. *B62D 5/0454* (2013.01); *B62D 3/04* (2013.01); *F16D 3/06* (2013.01); *F16D 3/10* (2013.01); *F16H 1/16* (2013.01)

(58) Field of Classification Search
CPC ..... F16D 3/04; F16D 3/06; F16D 3/10; F16D 2001/103; F16D 3/48; F16D 1/02; F16B 7/06; F16B 7/0413; F16B 7/042
USPC .............. 464/71–72, 137, 162, 182; 403/341
See application file for complete search history.

(56) References Cited

U.S. PATENT DOCUMENTS

| 7,235,014 B2 * | 6/2007 | Gilbert | ...................... F16D 3/48 464/93 |
| 2018/0065656 A1 * | 3/2018 | Yun | ........................... F16D 3/68 |

* cited by examiner

*Primary Examiner* — Randell J Krug
(74) *Attorney, Agent, or Firm* — Dickinson Wright PLLC

(57) ABSTRACT

A coupling assembly includes a flexible coupling and a first adapter. The flexible coupling defines an opening that extends along a central longitudinal axis between a first coupling end and a second coupling end. The first adapter is arranged to be at least partially received within the opening proximate the first coupling end. The first adapter extends between a first adapter first face and a first adapter second face. The first adapter defines a first adapter post and a first adapter hole. The first adapter post that extends from the first adapter first face. The first adapter hole that extends from the first adapter first face towards the first adapter second face.

20 Claims, 5 Drawing Sheets

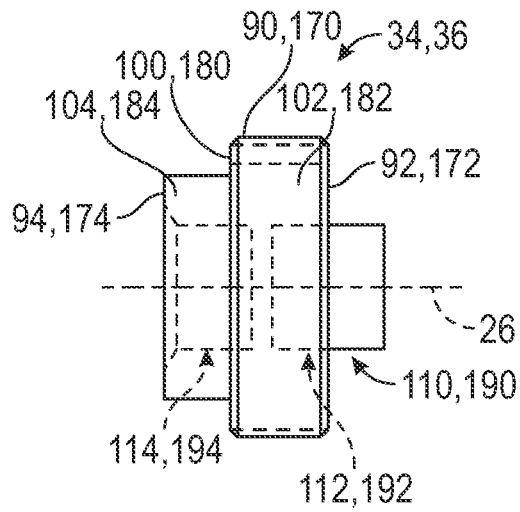 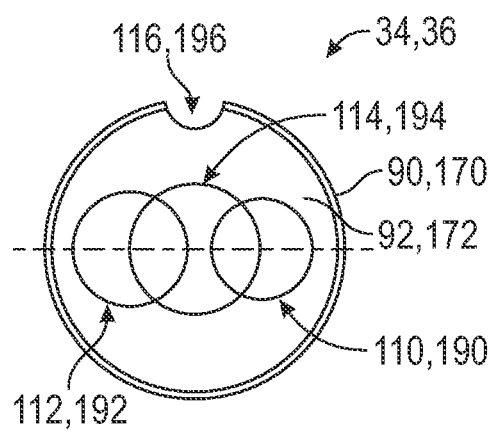
FIG. 5A  FIG. 5B
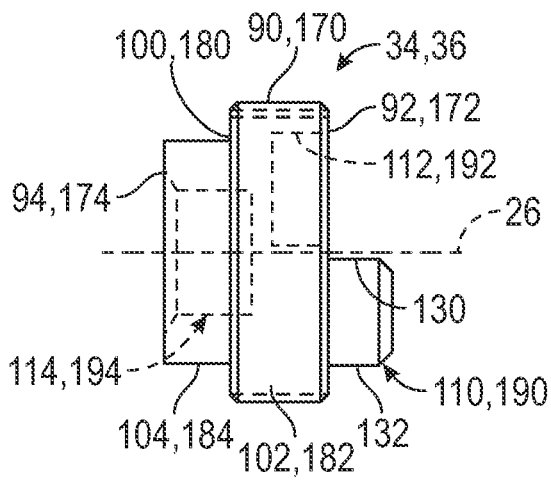 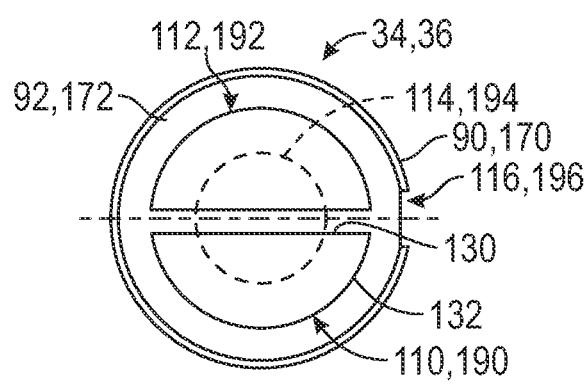
FIG. 6A  FIG. 6B
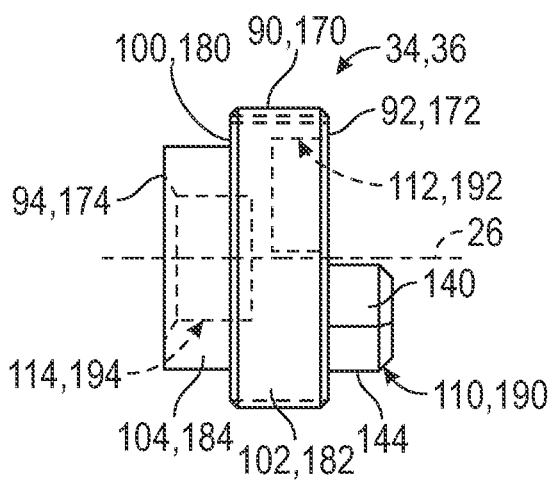 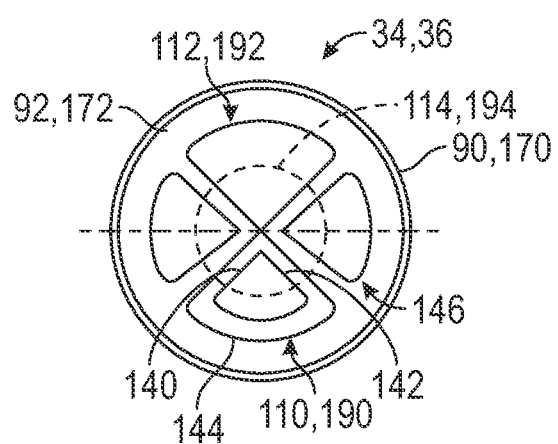
FIG. 7A  FIG. 7B

SHAFT COUPLING ASSEMBLY

CROSS-REFERENCE TO RELATED APPLICATIONS

This patent application is a divisional application of U.S. application Ser. No. 16/050,670, filed Jul. 31, 2018, which is incorporated herein by reference in its entirety.

BACKGROUND

Power steering systems using a worm and worm gear to amplify torque may include a coupler between a motor shaft and a worm shaft. The torque from the worm is transferred to the worm gear, to the assist output, and finally to the rack and pinion. The torque from the motor transmitted to the worm/worm gear may be diminished or cease should an incident occur with the coupling.

SUMMARY

Disclosed is a power assist system that includes a shaft provided with a worm that is driven by a motor through a motor shaft and a coupling assembly. The coupling assembly is disposed between ends of the shaft having the worm and the motor shaft. The coupling assembly is arranged to provide a mechanical interlock between the shaft having the worm and the motor shaft and facilitate axial compliance along a central longitudinal axis between the shaft having the worm and the motor shaft.

Also disclosed is a coupling assembly that includes a flexible coupling and a first adapter. The flexible coupling defines an opening that extends along a central longitudinal axis between a first coupling end and a second coupling end. The first adapter is arranged to be at least partially received within the opening proximate the first coupling end. The first adapter extends between a first adapter first face and a first adapter second face. The first adapter defines a first adapter post and a first adapter hole. The first adapter post that extends from the first adapter first face. The first adapter hole that extends from the first adapter first face towards the first adapter second face.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIGS. 5A and 5B are views of an adapter of the coupling assembly;
FIGS. 6A and 6B are views of an adapter of the coupling assembly;
FIGS. 7A and 7B are views of an adapter of the coupling assembly.

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
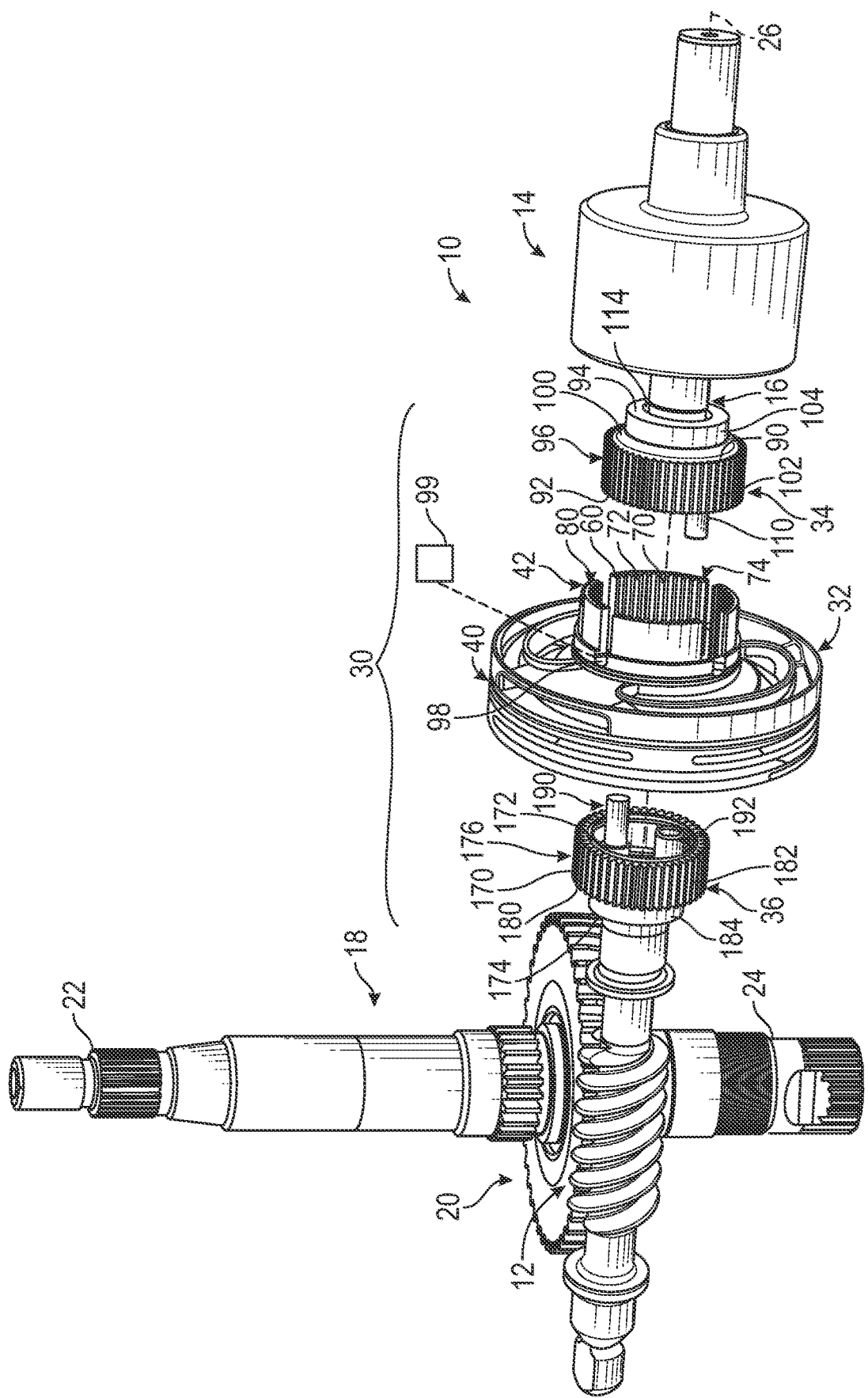
FIG. 1 is a disassembled view of a power assist system.

Referring to FIG. 1, a power assist system 10 includes a shaft provided with a worm 12 that is driven by a motor 14 through a motor shaft 16. The worm 12 is arranged to deliver a torque or a load to a shaft 18, such as a steering shaft, through a worm gear 20, providing an assist in steering to at least one vehicle wheel. The shaft 18 may be provided with a first end 22 that is connected to a steering wheel and a second end 24 that is arranged to provide the assist in steering to a steering rack or other component.

The shaft having the worm 12 may be provided as part of a steering gear assembly. The motor 14 may include the motor shaft 16 that drives the worm 12. The motor 14 may be an electric motor, a hydraulic actuator, an electric actuator, an electromechanical actuator, or other device capable of driving or imparting a load to the shaft having the worm 12.

The shaft having the worm 12, the motor 14, and the motor shaft 16 of the power assist system 10 each extend along a central longitudinal axis 26 that is disposed transverse to an axis along which the shaft 18 extends. In other embodiments, the shaft having the worm 12, the motor 14, and the motor shaft 16 of the power assist system 10 may not be coaxially disposed along the central longitudinal axis 26.

The motor 14 is arranged to receive a signal from a position sensor that provides a signal indicative of a rotary position or angular position of at least one of the shaft 18/a steering wheel or an automated driving assist system (ADAS). The motor 14 provides the assist load through the motor shaft 16 to the shaft having the worm 12 based on the signal.

The ADAS is in communication with the power assist system 10 and is arranged to operate the vehicle such that the vehicle may perform operations without continuous input from a driver (e.g. steering, accelerating, braking, maneuvering, turning, etc.), while operating in an autonomous mode or performing autonomous maneuvers/actions. The ADAS enables the vehicle to be at least partially autonomously controlled based on inputs received from a vehicle safety system, a global positioning system, a mapping system, a traffic notification system, or a monitoring system such that the vehicle may be an autonomous vehicle, a semi-autonomous vehicle, an autonomously driven vehicle, a selectively autonomous vehicle, a vehicle capable of performing controlled autonomous movements, or the like.

The power assist system 10 may be a steer by wire system such that there is no direct mechanical connection between the shaft 18 that is operatively connected to the steering rack and the motor 14 drives the shaft having the worm 12. In a steer by wire arrangement, the motor 14 may provide steering control or steering load to the steering gear assembly along with providing a steering assist load. Therefore, the connection between the motor 14 and the shaft having the worm 12 should be maintained to ensure steering or directional control of the vehicle is maintained.

A coupling assembly 30 is disposed between ends of the shaft having the worm 12 and the motor shaft 16 and is arranged to provide a mechanical interlock or a coupling that ensures a positive connection or drive between the shaft having the worm 12 and the motor shaft 16. The coupling assembly 30 also facilitates axial movement or axial compliance along a central longitudinal axis 26 between the shaft having the worm 12 and the motor shaft 16 of the motor 14. The coupling assembly 30 provides a redundant feature to ensure the transfer of torque from the motor 14 to the shaft having the worm 12, should an incident occur with the coupling assembly 30.

The coupling assembly 30 is shown being applied to a steering assembly, however the coupling assembly 30 may be used to connect shafts where angular misalignment between the shafts is possible. The coupling assembly 30 is arranged to facilitate a driving connection between a shaft having the worm 12 to the motor shaft 16 of the motor 14. The coupling assembly 30 includes a flexible coupling 32, a first adapter 34, and a second adapter 36.

Referring to FIGS. 1-4, the flexible coupling 32 is disposed about the central longitudinal axis 26. The flexible coupling 32 is arranged to at least partially receive the first adapter 34 and the second adapter 36. The flexible coupling 32 is arranged to restrict relative motion between the first adapter 34 and the second adapter 36 while also allowing axial compliance, axial movement, and torsional stiffness between the shaft having the shaft having the worm 12 and the motor shaft 16 of the motor 14. In other words, the flexible coupling 32 is arranged as a stiff coupler that allows lost motion between the shaft having the worm 12 and the motor shaft 16 of the motor 14. The flexible coupling 32 includes a coupling body 40 and a coupling extension 42 that extends from and is at least partially defined by or within the coupling body 40.

Figure 3:
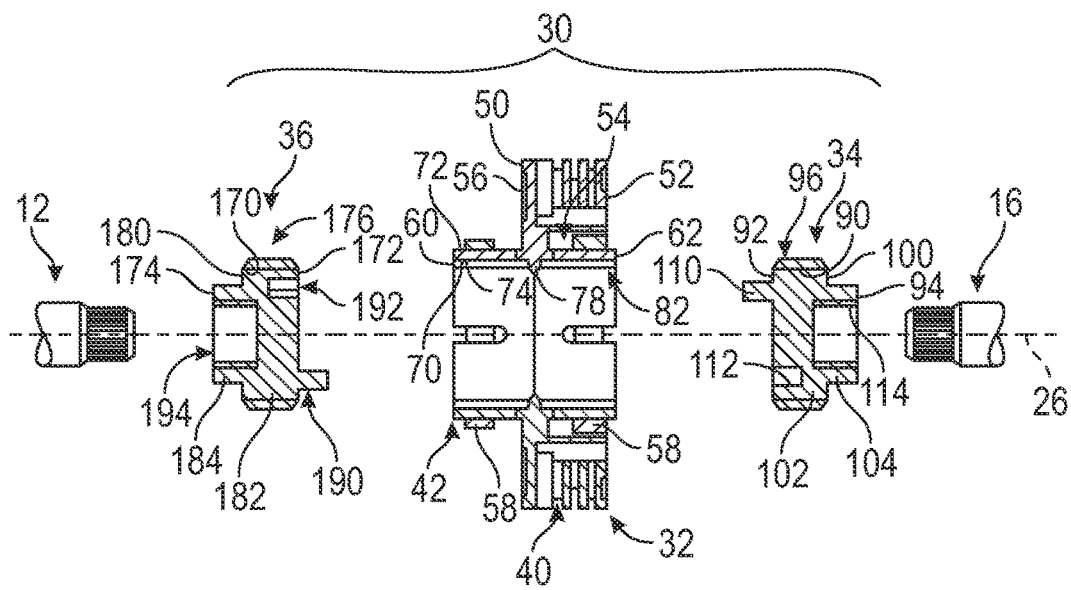
FIG. 3 as a disassembled view of the coupling assembly.
Figure 4:
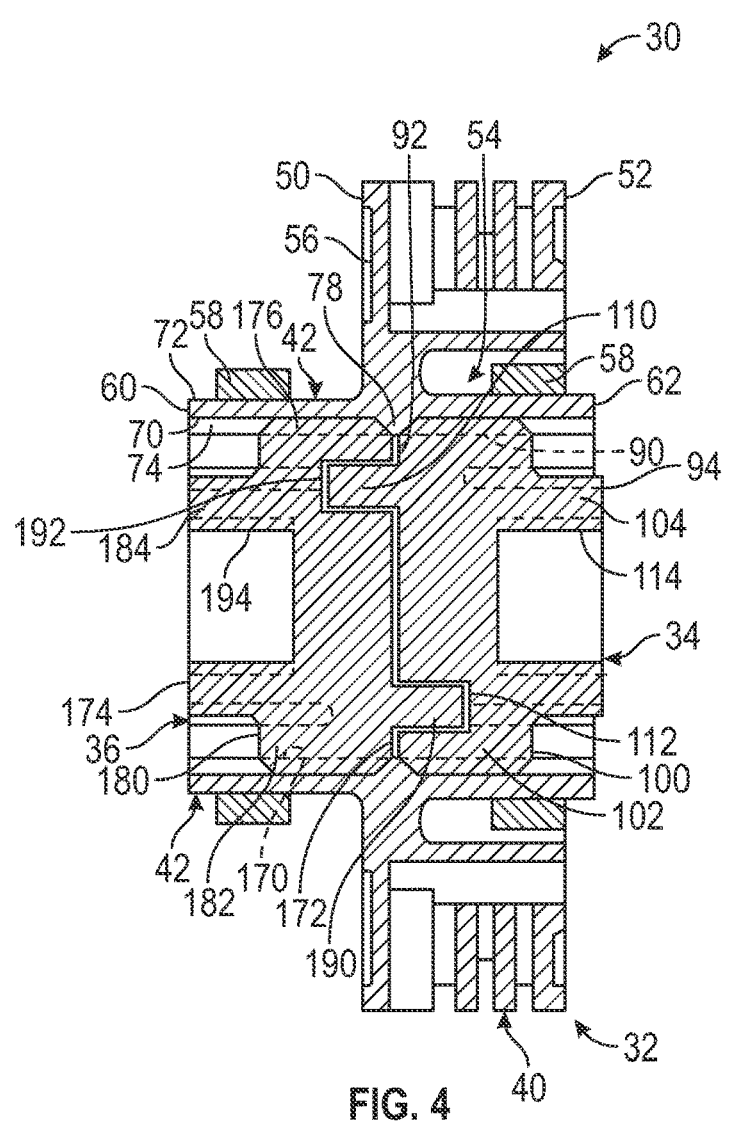
FIG. 4 is a cross-sectional view of the coupling assembly.

The coupling body 40 extends between a first coupling body face 50 and a second coupling body face 52 that is disposed opposite the first coupling body face 50. The coupling body 40 defines a recess 54 that extends from the second coupling body face 52 towards the first coupling body face 50 along the central longitudinal axis 26, as shown in FIGS. 3 and 4. The recess 54 may be radially disposed between the coupling extension 42 and a portion of the coupling body 40. A spring ring 58 may be received within the recess 54 and is arranged to assist in retaining the first adapter 34 within the flexible coupling 32, as shown in FIGS. 3 and 4.

The coupling body 40 may define at least one surface recess or surface depression 56 that is at least partially defined by the first coupling body face 50. At least one surface recess or surface depression 56 extends from the first coupling body face 50 towards the second coupling body face 52.

The coupling extension 42 extends between a first coupling end 60 and a second coupling end 62. The coupling extension 42 extends from the first coupling body face 50 in a first direction such that the first coupling end 60 is spaced apart from and is disposed generally parallel to the first coupling body face 50. The coupling extension 42 extends in a second direction such that the second coupling end 62 is spaced apart from and is disposed generally parallel to the second coupling body face 52. Another spring ring 58 may be disposed about the coupling extension 42 and is arranged to retain the second adapter 36 within the flexible coupling 32, as shown in FIGS. 3 and 4.

Figure 2:
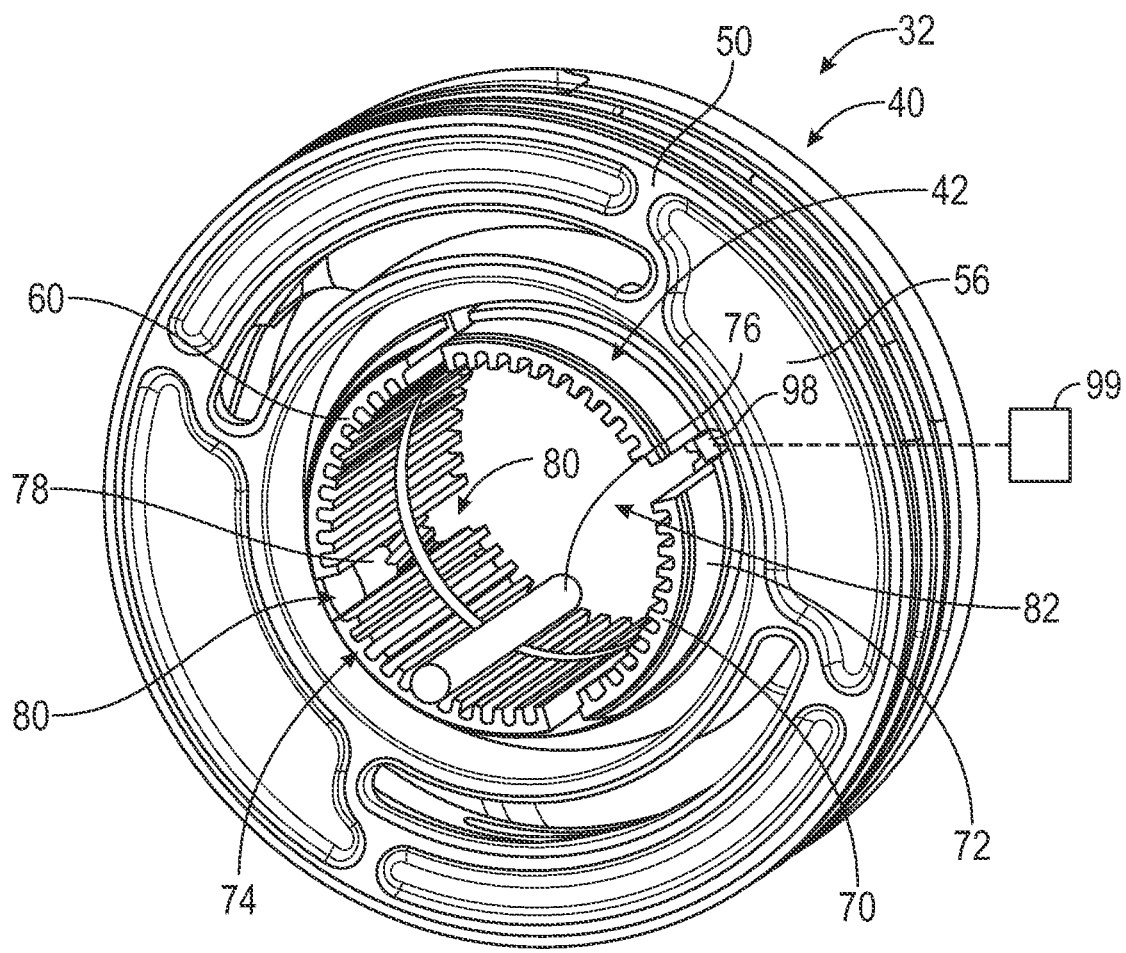
FIG. 2 is a perspective view of a flexible coupling of a coupling assembly.

Referring to FIGS. 2-4, the coupling extension 42 includes an inner surface 70 and an outer surface 72 that each extend between or are disposed between the first coupling end 60 and the second coupling end 62. The inner surface 70 defines a plurality of teeth or engagement members 74, a rib 76, and a stop 78.

The plurality of teeth or engagement members 74 axially extend between the first coupling end 60 and the second coupling end 62, along the central longitudinal axis 26. The plurality of teeth or engagement members 74 radially extend from the inner surface 70 towards the outer surface 72, relative to the central longitudinal axis 26.

In at least one embodiment, a discontinuity 80 may be defined between adjacent teeth or engagement members of the plurality of teeth or engagement members 74. The discontinuity 80 may axially extend from the first coupling end 60 towards the second coupling end 62 and/or may axially extend from the second coupling end 62 towards the first coupling end 60. The discontinuity 80 may radially extend towards or through the outer surface 72. The discontinuity 80 may be configured as a notch, a recess, opening, or the like.

The rib 76 may be defined between adjacent teeth or engagement members of the plurality of teeth or engagement members 74. The rib 76 may axially extend between the first coupling end 60 and the second coupling end 62. The rib 76 may radially extend towards the central longitudinal axis 26. The rib 76 is arranged to extend into or engage at least one of the first adapter 34 and/or the second adapter 36 to approximately align the first adapter 34 and the second adapter 36 with each other.

The stop 78 may extend from the inner surface 70 towards the central longitudinal axis 26. The stop 78 is disposed between faces of the first adapter 34 and the second adapter 36. The stop 78 circumferentially extends about the inner surface 70 and is disposed between the first coupling end 60 and the second coupling end 62. The stop 78 is disposed generally parallel to the first coupling end 60 and the second coupling end 62.

The inner surface 70 is disposed about an opening 82, such that the opening 82 extends between the first coupling end 60 and the second coupling end 62 along the central longitudinal axis 26.

Referring to FIGS. 1, 3, and 4, the first adapter 34 is arranged to be at least partially received within the opening 82 proximate the first coupling end 60 of the flexible coupling 32. The first adapter 34 includes a first adapter exterior 90 that extends between a first adapter first face 92 and a first adapter second face 94. The first adapter exterior 90 may define a plurality of adapter teeth or adapter engagement members 96 that are arranged to engage the plurality of teeth or engagement members 74 of the flexible coupling 32. The plurality of adapter teeth or adapter engagement members 96 axially extend from the first adapter first face 92 towards the first adapter second face 94. The plurality of adapter teeth or adapter engagement members 96 engage the plurality of teeth or engagement members 74 the flexible coupling 32 to maintain clearance between an adapter post of the first adapter 34 and a corresponding adapter hole of the second adapter 36.

A sensor 98 may be provided with or disposed on the flexible coupling 32 or the coupling assembly 30, as shown in FIGS. 1 and 2. The sensor 98 may be a detection component that is arranged to provide a signal to a control module 99 indicative of an issue or incident with the coupling assembly 30. The issue or incident with the coupling assembly 30 may be any one of: 1) angular travel between the shaft having the worm 12 and the motor shaft 16 of the motor 14 about the central longitudinal axis 26 being greater than a threshold; 2) the clearance between the first adapter 34 and the second adapter 36 being less than a threshold clearance; or 3) the adapter post of the first adapter 34 fully seating within the corresponding adapter hole of the second adapter 36 or engaging an end surface of the corresponding adapter hole of the second adapter 36. Responsive to the control module 99 receiving the signal from the sensor 98, the control module 99 outputs for display an indicator to an operator of the vehicle, such as an audible warning, haptic feedback, etc.

In at least one embodiment, the plurality of adapter teeth or adapter engagement members 96 axially extend from the first adapter first face 92 towards an end surface 100, such that the plurality of adapter teeth or adapter engagement members 96 are defined by a first portion 102 of the first adapter 34. A second portion 104 of the first adapter 34 may extend from the end surface 100 towards the first adapter second face 94. The second portion 104 may not be provided with a plurality of adapter teeth or adapter engagement members and may have a cross-sectional form that is less than a cross-sectional form of the first portion 102 of the first adapter 34.

The first adapter 34 defines a first adapter post 110, a first adapter hole 112, a first adapter mounting hole 114, and a first adapter notch 116.

The first adapter post 110 extends from the first adapter first face 92 along a first axis 120 such that the first adapter post 110 is radially offset from and disposed generally parallel to the central longitudinal axis 26. The first adapter post 110 extends in a direction that extends from the first adapter second face 94 towards the first adapter first face 92. The first adapter post 110 is arranged to extend into an opening or a hole defined by the second adapter 36.

Referring to FIGS. 5A and 5B, the first adapter post 110 may have a generally cylindrical shape and the first adapter hole 112 may have a generally circular or cylindrical shape.

Referring to FIGS. 6A and 6B, the first adapter post 110 may have a first planar surface 130 and a first arcuate surface 132. The first arcuate surface 132 extends between the radial ends of the first planar surface 130, such that the first adapter post 110 has a generally half cylindrical shape. The first adapter post 110 may have an enlarged surface area to increase the adapter post strength. The first adapter post 110 may define a contact area between an inside surface of a corresponding hole of the second adapter 36. The first adapter hole 112 may also have a generally half cylindrical shape that is inverted relative to the first adapter post 110 or that is reflected about an axis that is disposed transverse to the central longitudinal axis 26.

Referring to FIGS. 7A and 7B, the first adapter post 110 may have a first planar surface 140, a second planar surface 142 that extends from the first planar surface 140, and a first arcuate surface 144 extending between ends of the first planar surface 140 and the second planar surface 142, such that the first adapter post 110 has a general wedge or triangular shape. The first adapter hole 112 may also have a general wedge or triangular shape that is inverted relative to the first adapter post 110 or that is reflected about an axis that is disposed transverse to the central longitudinal axis 26. In at least one embodiment, an additional hole 146 may be provided that has a substantially similar shape and configuration as the first adapter hole 112. The additional hole 146 may have a cross-sectional area that is less than the cross-sectional area of the first adapter hole 112. The additional hole 146 may be operatively empty and circumferentially offset from the first adapter post 110 and the first adapter hole 112.

Figure 8A:
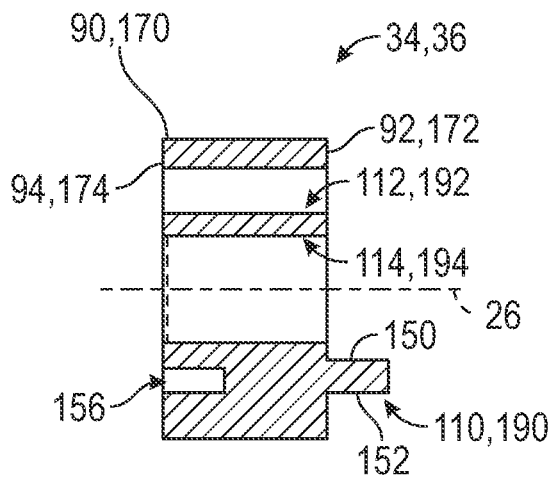
FIGS. 8A and 8B are views of an adapter of the coupling assembly.
Figure 8B:
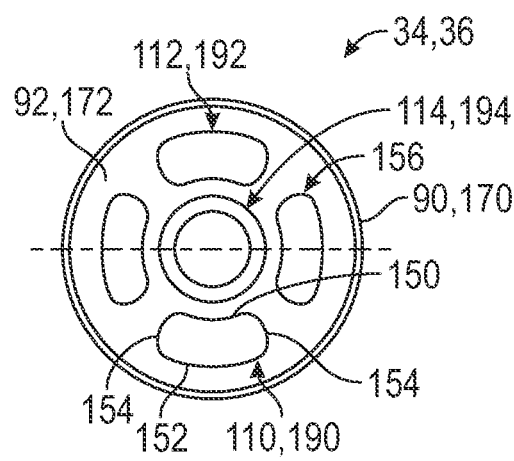

Referring to FIGS. 8A and 8B, the first adapter post 110 may have a first arcuate surface 150, a second arcuate surface 152 that is spaced apart from and disposed parallel to the first arcuate surface 150, and end surfaces 154 extending between ends of the first arcuate surface 150 and the second arcuate surface 152, such that the first adapter post 110 may have a general half-moon shape. The first adapter hole 112 may also have a general half-moon shape that is inverted relative to the first adapter post 110 or may be reflected about an axis that is disposed transverse to the central longitudinal axis 26. In at least one embodiment, an additional hole 156 may be provided that has a substantially similar shape and configuration as the first adapter hole 112. The additional hole 156 may have a cross-sectional area that is less than the cross-sectional area of the first adapter hole 112. The additional hole 156 may be operatively empty and circumferentially offset from the first adapter post 110 and the first adapter hole 112.

Figure 9A:
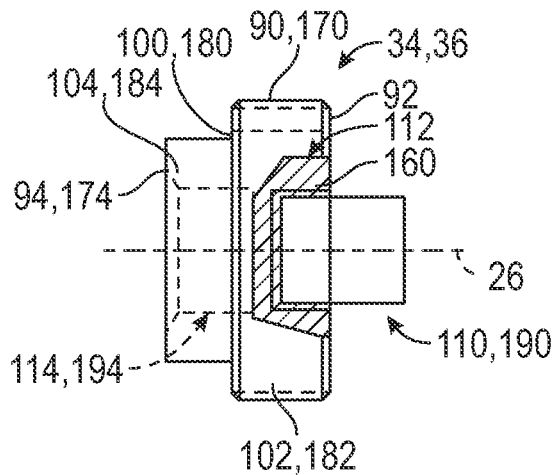
FIGS. 9A and 9B are views of an adapter of the coupling assembly.
Figure 9B:
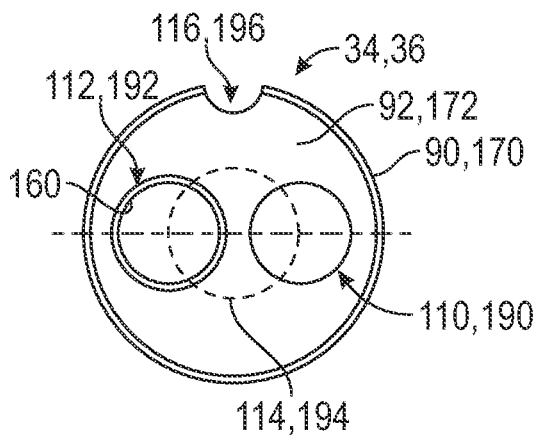

Referring to FIGS. 9A and 9B, a liner 160 may be disposed within the first adapter hole 112. The liner 160 may be made of a compliant material that prevents or inhibits vibration or noise should a corresponding post of the second adapter 36 extend into or be disposed within the first adapter hole 112.

Figure 10A:
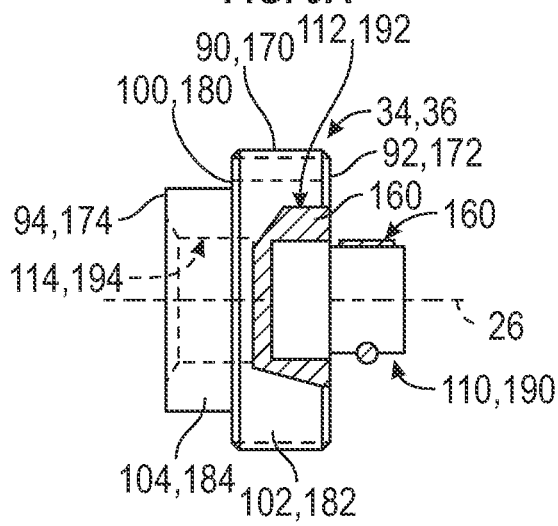
FIGS. 10A and 10B are views of an adapter of the coupling assembly.
Figure 10B:
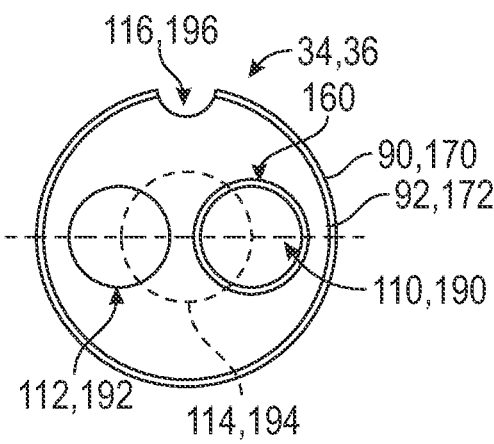

Referring to FIGS. 10A and 10B, a liner 160 may be disposed about the first adapter post 110. As stated previously the liner 160 may be made of a compliant material that prevents or inhibits vibration or noise should the first adapter post 110 extend into or be disposed within a corresponding hole of the second adapter 36.

The first adapter hole 112 extends from the first adapter first face 92 towards the first adapter second face 94 and/or the end surface 100 along a second axis 122. The second axis 122 may be offset from and disposed generally parallel to the central longitudinal axis 26 and the first axis 120. The first adapter hole 112 is arranged to receive a post of the second adapter 36.

The first adapter mounting hole 114 extends from the first adapter second face 94 towards the first adapter first face 92 along an axis that is disposed generally parallel to and coaxial with the central longitudinal axis 26 and is offset from the first axis 120 along which the first adapter post 110 extends and the second axis 122 along which the first adapter hole 112 extends. An end of the shaft having the worm 12 or an end of the motor shaft 16 is arranged to at least partially extend into the first adapter mounting hole 114.

Referring to FIGS. 5B, 6B, 9B, and 10B, the first adapter notch 116 extends from the first adapter exterior 90 towards the first adapter axis 124 and/or the central longitudinal axis 26. The rib 76 of the flexible coupling 32 is arranged to be received within the first adapter notch 116. The rib 76 is arranged to align the first adapter post 110 of the first adapter 34 with a corresponding hole of the second adapter 36. The rib 76 is also arranged to align the first adapter hole 112 of the first adapter 34 with the corresponding post of the second adapter 36.

Referring to FIGS. 1, 3, and 4, the second adapter 36 is arranged to be at least partially received within the opening 82 proximate the second coupling end 62. The second adapter 36 has a substantially similar configuration as the first adapter 134, such that in some embodiments, the second adapter 36 is merely the first adapter 34 rotated about the central longitudinal axis 26 and/or reflected about and axis disposed transverse to the central longitudinal axis 26.

The second adapter 36 includes a second adapter exterior 170 that extends between a second adapter first face 172 and a second adapter second face 174. The second adapter exterior 170 may define a plurality of adapter teeth or adapter engagement members 176 that are arranged to engage the plurality of teeth or engagement members 74 of the flexible coupling 32. The plurality of adapter teeth or adapter engagement members 176 axially extend from the second adapter first face 172 towards the second adapter second face 174. The plurality of adapter teeth or adapter engagement members 176 engage the plurality of teeth or engagement members 74 the flexible coupling 32 to maintain clearance between an adapter post of the second adapter 36 and a corresponding adapter hole 112 of the first adapter 34.

In at least one embodiment, the plurality of adapter teeth or adapter engagement members 176 axially extend from the second adapter first face 172 towards an end surface 180, such that the plurality of adapter teeth or adapter engagement members 176 are defined by a first portion 182 of the second adapter 36. A second portion 184 of the second adapter 36 may extend from the end surface 180 towards the second adapter second face 174. The second portion 184 may not be provided with a plurality of adapter teeth or adapter engagement members and may have a cross-sectional form that is less than a cross-sectional form of the first portion 182 of the second adapter 36.

The second adapter 36 defines a second adapter post 190, a second adapter hole 192, a second adapter mounting hole 194, and a second adapter notch 196.

The second adapter post 190 extends from the second adapter first face 172 along the second axis 122. The second adapter post 190 is aligned with the first adapter hole 112 along the second axis 122 while the second adapter 36 is disposed within the opening 82. The second adapter post 190 is arranged to be received within the first adapter hole 112, as shown in FIG. 4. The second adapter post 190 may have a substantially similar configuration as the first adapter post 110. In at least one embodiment, the liner 160 may be disposed about the second adapter post 190.

The second adapter hole 192 extends from the second adapter first face 172 towards the second adapter second face 174 along the first axis 120. The second adapter hole 192 is aligned with the first adapter post 110 along the first axis 120. The second adapter hole 192 is arranged to receive the first adapter post 110, as shown in FIG. 4. The second adapter hole 192 may have a substantially similar configuration as the first adapter hole 112. In at least one embodiment, the liner 160 may be disposed within the second adapter hole 192.

The second adapter mounting hole 194 extends from the second adapter second face 174 towards the second adapter first face 172 along a second adapter axis that is disposed substantially coaxial with the central longitudinal axis 26.

An end of the shaft having the worm 12 is arranged to at least partially extend into the second adapter mounting hole 194. The second adapter mounting hole 194 may have a substantially similar configuration as the first adapter mounting hole 114.

The second adapter notch 196 extends from the second adapter exterior 170 towards the second adapter axis and/or the central longitudinal axis 26. The rib 76 of the flexible coupling 32 is arranged to be received within the second adapter notch 196. The rib 76 is arranged to align the second adapter post 190 of the second adapter 36 with a corresponding hole of the first adapter 34 (e.g. the first adapter hole 112). The rib 76 is also arranged to align the second adapter hole 192 of the second adapter 36 with the corresponding post of the first adapter 34 (e.g. the first adapter post 110).

The coupling assembly 30 is arranged to provide a redundant connection mechanism between the shaft having the worm 12 and the motor 14 to ensure that the motor 14 continues to be drivably connected to the shaft having the worm 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

What is claimed is:

1. A power assist system, comprising:
   a shaft provided with a worm that is driven by a motor through a motor shaft; and
   a coupling assembly disposed between ends of the shaft having the worm and the motor shaft, the coupling assembly being arranged to provide a mechanical interlock between the shaft having the worm and the motor shaft and facilitate axial compliance along a central longitudinal axis between the shaft having the worm and the motor shaft, wherein the coupling assembly comprises:
   a flexible coupling having an inner surface defining an opening that extends along a central longitudinal axis between a first coupling end and a second coupling end, and a rib extending from the inner surface towards the central longitudinal axis;
   a first adapter having a first adapter exterior that extends between a first adapter first face and a first adapter second face, the first adaptor exterior arranged to be at least partially received in the opening proximate the first coupling end; and
   a second adapter having a second adapter exterior that extends between a second adapter first face and a second adapter second face, the second adaptor exterior arranged to be at least partially received in the opening proximate the second coupling end,
   wherein the rib aligns the first adapter and the second adapter relative to one another.

2. The power assist system of claim 1, the opening having a plurality of coupling teeth, wherein the first adapter has a plurality of first adaptor teeth arranged to engage the plurality of coupling teeth and the second adapter has a plurality of second adaptor teeth arranged to engage the plurality of coupling teeth.

3. The power assist system of claim 1, wherein the first adapter defines a first adapter post that extends from the first adapter first face and a first adapter hole that extends from the first adapter first face towards the first adapter second face; and the second adapter defines a second adapter post that extends from the second adapter first face and a second adapter hole that extends from the second adapter first face towards the second adapter second face.

4. The power assist system of claim 3, wherein the first adapter post is arranged to be received within the second adapter hole.

5. The power assist system of claim 3, wherein the flexible coupling is arranged to restrict relative motion between the first adapter and the second adapter about the central longitudinal axis.

6. The power assist system of claim 3, wherein the second adapter post is arranged to be received within the first adapter hole.

7. The power assist system of claim 3, wherein the second adapter defines a second mounting hole that extends from the second adapter second face towards the second adapter first face along a second adapter axis.

8. The power assist system of claim 7, wherein an end of the motor shaft that is arranged to at least partially extend into the second mounting hole.

9. The power assist system of claim 3, wherein the first adapter defines a first mounting hole that extends from the first adapter second face towards the first adapter first face along a first adapter axis.

10. The power assist system of claim 9, wherein at least one of the first adapter post and the first adapter hole are offset from the first adapter axis.

11. The power assist system of claim 9, wherein the first adapter axis is disposed parallel to the central longitudinal axis.

12. The power assist system of claim 9, wherein the first adapter defines a first adapter notch that extends from the first exterior towards the first mounting hole, wherein the rib is at least partially received in the first adaptor notch.

13. A power assist system, comprising:
a shaft provided with a worm that is driven by a motor through a motor shaft;
a coupling assembly disposed between ends of the shaft having the worm and the motor shaft, the coupling assembly being arranged to provide a mechanical interlock between the shaft having the worm and the motor shaft and facilitate axial compliance along a central longitudinal axis between the shaft having the worm and the motor shaft;
a flexible coupling defining an opening that extends along a central longitudinal axis between a first coupling end and a second coupling end;
a first adapter having a first adapter exterior that extends between a first adapter first face and a first adapter second face, the first adapter defining a first adapter post that extends from the first adapter first face and a first adapter hole that extends from the first adapter first face towards the first adapter second face; and
a second adapter having a second adapter exterior that extends between a second adapter first face and a second adapter second face, the second adapter defining a second adapter post that extends from the second adapter first face and a second adapter hole that extends from the second adapter first face towards the second adapter second face,
wherein the first adapter defines a first mounting hole that extends from the first adapter second face towards the first adapter first face along a first adapter axis,
wherein the first adapter defines a first adapter notch that extends from the first exterior towards the first mounting hole,
wherein the flexible coupling defines a rib that extends from an inner surface towards the central longitudinal axis.

14. The power assist system of claim 13, wherein the rib is arranged to be at least partially received within the first adapter notch.

15. A power assist system, comprising:
a shaft provided with a worm that is driven by a motor through a motor shaft; and
a coupling assembly disposed between ends of the shaft having the worm and the motor shaft, the coupling assembly being arranged to provide a mechanical interlock between the shaft having the worm and the motor shaft and facilitate axial compliance along a central longitudinal axis between the shaft having the worm and the motor shaft, wherein the coupling assembly comprises:
a flexible coupling having an inner surface defining an opening that extends along a central longitudinal axis between a first coupling end and a second coupling end, the opening having a plurality of coupling teeth;
a first adapter having a first adapter exterior that extends between a first adapter first face and a first adapter second face, the first adaptor exterior arranged to be at least partially received in the opening proximate the first coupling end and having a plurality of first adaptor teeth arranged to engage the plurality of coupling teeth; and
a second adapter having a second adapter exterior that extends between a second adapter first face and a second adapter second face, the second adaptor exterior arranged to be at least partially received in the opening proximate the second coupling end; and
a sensor disposed on the coupling assembly, the sensor being arranged to provide a signal indicative of an incident with the coupling assembly to a control module.

16. A coupling assembly, comprising:
a flexible coupling defining an opening that extends along a central longitudinal axis between a first coupling end and a second coupling end;
a first adapter arranged to be at least partially received within the opening proximate the first coupling end, the first adapter extending between a first adapter first face and a first adapter second face, the first adapter defining:
a first adapter post that extends away from the first adapter first face, and
a first adapter hole that extends from the first adapter first face towards the first adapter second face,
further comprising a second adapter arranged to be at least partially received within the opening proximate the second coupling end, the second adapter extending between a second adapter first face and a second adapter second face, the second adapter defining:
a second adapter post that extends from the second adapter first face and is arranged to be received within first adapter hole, and
a second adapter hole that extends from the second adapter first face towards the second adapter second face and is arranged to receive the first adapter first post,
wherein the first adapter post includes a first planar surface and a first arcuate surface that extends between radial ends of the first planar surface.

17. The coupling assembly of claim 16, wherein the first adapter post includes a first planar surface, a second planar surface extending from the first planar surface, and a first arcuate surface extending between ends of the first planar surface and the second planar surface.

18. The coupling assembly of claim 16, wherein the first adapter post includes a first arcuate surface, a second arcuate surface disposed parallel to the first arcuate surface, and end surfaces extending between ends of the first arcuate surface and the second arcuate surface.

19. The coupling assembly of claim 16, further comprising a liner disposed about at least one of the first adapter post and the first adapter hole.

20. A power assist system, comprising:
a shaft provided with a worm that is driven by a motor through a motor shaft; and
a coupling assembly disposed between ends of the shaft having the worm and the motor shaft, the coupling assembly being arranged to provide a mechanical interlock between the shaft having the worm and the motor shaft and facilitate axial compliance along a central longitudinal axis between the shaft having the worm and the motor shaft, wherein the coupling assembly comprises:
a flexible coupling having an inner surface defining an opening that extends along a central longitudinal axis between a first coupling end and a second coupling end, the opening having a plurality of coupling teeth;
a first adapter having a first adapter exterior that extends between a first adapter first face and a first adapter second face, the first adaptor exterior arranged to be at least partially received in the opening proximate the first coupling end and having a plurality of first adaptor teeth arranged to engage the plurality of coupling teeth; and
a second adapter having a second adapter exterior that extends between a second adapter first face and a second adapter second face, the second adaptor exterior arranged to be at least partially received in the opening proximate the second coupling end, wherein the second adapter has a plurality of second adaptor teeth arranged to engage the plurality of coupling teeth,
wherein a first adaptor first portion extends from the first adapter first face toward the first adapter second face, and a first adaptor second portion extends from the first adaptor first portion to the first adapter second face, and wherein a second adaptor first portion extends from the second adapter first face toward the second adapter second face, and a second adaptor second portion extends from the second adaptor first portion to the second adapter second face, wherein the first adaptor teeth extend along the first adaptor first portion but not the first adaptor second portion, and the second adaptor teeth extend along the second adaptor first portion but not the second adaptor second portion.

* * * * *